United States Patent Office
3,506,601
Patented Apr. 14, 1970

3,506,601
ELECTRODEPOSITION OF THERMOSETTING COATINGS FROM AQUEOUS MEDIUM UTILIZING COPOLYMERS CONTAINING INSUFFICIENT CARBOXYLIC ACID FOR EFFECTIVE DISPERSION IN WATER IN THE ABSENCE OF AN HYDROXY COMPONENT IN THE COPOLYMER
Kazys Sekmakas, Chicago, Ill., assignor to DeSoto, Inc., a corporation of Delaware
No Drawing. Filed Oct. 6, 1966, Ser. No. 584,654
Int. Cl. C08f 21/04
U.S. Cl. 260—21
14 Claims

ABSTRACT OF THE DISCLOSURE

An aqueous dispersion particularly adapted for electrodeposition of coatings is provided by dispersing in the water a salt of a base with a solution copolymer containing a small proportion of monoethylenically unsaturated carboxylic acid, a proportion of unsaturated hydroxy-terminated condensation resin containing esters of polyhydric alcohols with fatty acid and a proportion of unsaturated monomer providing a primary or secondary hydroxy group. The proportion of acid is insufficient to effectively disperse the copolymer through salt formation in the absence of the hydroxy-containing component of the copolymer.

---

The present invention relates to thermosetting resins which are particularly adapted to be dispersed in an aqueous bath composition and applied by electrophoretic deposition methods, it being a particular feature of the invention to apply glossy enamel coatings which thermoset to provide films which are highly resistant to deterioration in contrast with the coatings which are usually associated with electrophoretic deposition, e.g., flat, heavily pigmented primer coatings which must be overcoated with enamels in order to have good properties.

In accordance with normal electrophoretic deposition as practiced in the application of primers, a resin containing carboxyl functionality is associated with a base, usually a volatile nitrogenous base and dispersed in an aqueous medium therewith, the salt formed between the carboxyl-containing resin and the base being dissociated by a unidirectional electrical current and transported thereby to cause the resin to deposit on the anode of the electrical circuit.

In this past practice, the carboxyl-containing resin was formulated to include an acid number in the range of from 30–300, but more usually about 80–120, and the acid value of the resin was relied upon to carry out two different functions, e.g., dispersibility in water through salt formation and transport of the resin as a polyelectrolyte to the anode.

The result of this generally excessive acidity is that the resin deposited from the aqueous medium retains considerable sensitivity to water, clearly reducing the capacity of the resin, even when cured, to resist deterioration as illustrated by salt spray or detergent solution testing. On the other hand, the main purpose of the electrophoretic deposition was merely to insure that the metal object coated, e.g., an automobile, would be provided with at least some minimal protection in locations too remote to receive a paint applied in any normal fashion. With respect to those locations which were accessible, these were given further protection, e.g., by way of an enamel topcoat.

The present invention proceeds in a different direction in order to directly deposit resin coatings in which the resin component of the coating is capable of cure and adapted to provide the exposure resistance or detergent resistance or the like which is needed so that topcoating can be dispensed with, if desired. To this end, the acid number of the resin is greatly reduced, preferably to an acid number below 30, but in any event beyond the level at which the resin in question is capable of effective dispersion in water utilizing only the acidity of the resin as the basis for dispersion via salt formation therewith. In this respect, the reduced acid values relied upon in the present invention not only provide coatings which are far less sensitive to water, but the conductivity of the film is reduced so that excessively thick films are not deposited.

An acid number of about 50 represents an approximate upper limit in accordance with the invention. Above this value the acidity is not fully consumed during cure and the residual acidity is a problem. Also, if one relies upon the carboxyl groups to provide the needed cross-link density, then the incompleteness of cure again presents a fully successful effect.

More particularly, and in accordance with the invention, an addition copolymer is formulated to include a monoethylenically unsaturated carboxylic acid in small amount, preferably providing an acid number less than 50, and more preferably less than about 30 and which, in the absence of the hydroxy-containing component of the polymer is insufficient for effective dispersion of the polymer. The capacity of carboxyl groups to enable a stable dispersion to be provided and the interpolymer is further formulated to include an hydroxy component such as hydroxy ethyl acrylate to thereby provide an hydroxy-containing interpolymer which contains a small proportion of acid sufficient to enable dispersion thereof with a base, and especially a volatile nitrogenous base such as ammonia or an organic amine, in view of the presence of the hydroxy component which facilitates dispersion in water (but which alone is not sufficient for this purpose).

These polymers have been found to be adequately dispersible in water salt formation as aforesaid and to electrophoretically deposit films of minimal conductivity which cure on baking (normally at temperatures in the range of 350–400° F.) to provide good resistance to solvent attack and which are suitable as single coat enamels (either clear or pigmented as desired).

It is desired to point out that one cannot rely upon acid value of the resin for cure since reasonably adequate cure requires a minimum cross-link density to be achieved, and this is especially true for those resins of sufficiently low molecular weight to enable dispersion in water. When the resin contains sufficient acidity to provide an adequate cross-link density, then it is difficult to consume all of the acid groups during the cure, and the residual acidity leads to failure when the coated and baked panel is tested for salt spray resistance and detergent resistance. On the other hand, when the acidity is reduced, the dispersions tend to become unstable and there is not enough acidity to provide an adequate cross-link density when cured. This is the area in which the present development exists, e.g., if it were not for the hydroxy component, the resin would either tend to be unstable in dispersion or not dispersible, or it would not cure adequately. More specifically, if the hydroxy ethyl acrylate component in the invention were replaced by the same weight of ethyl acrylate, one would find inadequate dispersibility in water, or inadequate cure, or both.

In the invention, the hydroxy component may constitute from 5–65% by weight, based on the weight of the copolymer, the larger proportions of hydroxy component being more useful when a portion of the hydroxy component is drying oil-modified condensation resin as described more fully hereinafter.

In the preferred practice of the invention, the hydroxy component of the copolymer comprises a drying oil-modified hydroxy-terminated condensation resin, typically a polyester formed by the reaction of components including dicarboxylic acid with polyhydric alcohols comprising a major proportion of aliphatic polyhydric compounds containing at least three hydroxy groups. When these are interpolymerized there is provided a copolymer having reactive hydroxy groups, carboxy groups, as well as reactive unsaturation and which can be cured by reactions including transesterification of carboxyl and hydroxyl groups, etherification of hydroxy groups and by polymerization of residual unsaturation present in the drying oil portion of the condensation resin.

The cure can be further improved through the use of amino resins capable of being dispersed or dissolved in water either alone or with the aid of a base, especially those described in my prior copending application Ser. No. 529,924, filed Feb. 25, 1966, now U.S. Patent No. 3,450,660, issued June 17, 1969.

It should be noted that despite the plurality of functional groups which are available for cure, that all of these groups are present in a single molecule so that only a single resin phase is available to respond to the electrophoretic transporting forces and this insures that the resin phase remains uniform with no portion thereof building up in the aqueous bath composition which is utilized.

Referring more particularly to the hydroxy-functional polyesters which are utilized in accordance with the invention, these have a high hydroxy functionality and the hydroxy-functional materials which are used in the preparation of the polyester are preferably highly branched for superior solvent solubility.

Thus, the components which are polyesterified should include at least 1.5 equivalents of hydroxy functionality per equivalent of carboxy functionality. Preferably, the ratio of hydroxy to carboxy is at least 2.0:1 and at least 50% of the hydroxy-functional materials used should contain at least three hydroxy groups per molecule, these being illustrated by glycerin, trimethylol propane, pentaerythritol, and the like. Glycols such as ethylene glycol, propylene glycol, butylene glycol, diethylene glycol, and the like, may be present. Dicarboxylic acid such as any of the phthalic acids or the anhydride of orthophthalic acid are normally used to form the polyester, but aliphatic acids such as adipic acid and succinic acid are also useful as are unsaturated acids such as maleic acid and fumaric acid. Tribasic acids such as trimellitic anhydride and tetrabasic acids such as mellitic dianhydride may be used, but are preferably absent or their proportion minimized to minimize the tendency toward gelation.

The polyesters used in the invention are polyethylenically unsaturated, the unsaturation being provided by including a proportion of material possessing ethylenic unsaturation. The unsaturation can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used, such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, thus conjugated unsaturation providing reactive double bonds to enable copolymerization. Incorporation of monocarboxylic acids is facilitated by the use of glycerine in the production of the polyester. When the glycerine polyester is preformed, the monoacid reacts with the secondary hydroxyl group of the glycerine residue but, as is known, the polybasic acid, the glycerine, and the monoacid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1) alpha,beta-unsaturation; (2) beta,gamma-unsaturation; or (3) conjugated unsaturation.

Broadly, the unsaturated polyester resin should contain about 0.005 to 0.40 gram mole of ethylenically unsaturated component per 100 grams of polyester. The copolymers may broadly contain from 5–50% of unsaturated polyester resin, but proportions of from 5–30% are preferred. As is well known, oil modification introduces esters of polyhydric alcohols with fatty acid in the resin.

The polyesters described hereinbefore are copolymerized with various ethylenically unsaturated monomers, it being possible to select mixtures of these to provide products which range from flexible materials to hard materials. As is known, the selection is made by balancing the proportion of monomers which by themselves form very hard polymers with the proportion of monomers which by themselves form very soft monomers.

The unsaturated monomers which may be used in the invention may be constituted by any copolymerizable monoethylenically unsaturated monomer. The more usual monomers are illustrated by styrene, vinyl toluene, ethyl acrylate, n-butyl or isobutyl acrylate, methyl methacrylate, n-butyl or isobutyl methacrylate, acrylonitrile, n-butyl vinyl ether, methyl vinyl ether, etc., but styrene, vinyl toluene, acrylonitrile and the $C_1$–$C_4$ esters of acrylic acid are particularly preferred to constitute the major proportion of the non-hydroxy-containing portion of the copolymer. These and other monomers containing the $CH_2=C<$ group are preferred, but the copolymers of the invention may even include minor proportions of monomers which are somewhat antagonistic to water because they contain a lipophilic terminal group, e.g., a hydrocarbon chain containing at least 4 carbon atoms. Examples of such monomers include stearyl and lauryl acrylate as well as the corresponding methacrylates. Butyl methacrylate is of this type, but more of it can be tolerated because it is of minimal chain length. Dibutyl maleate or fumarate are also useful, but the proportion of these is desirably minimized.

The monomers used in forming the copolymers (whether the hydroxy-functional unsaturated polyester is present or absent) must include a significant proportion of one or more monomers providing a primary or secondary hydroxy group. These are illustrated by 2-hydroxy ethyl acrylate, 2-hydroxy ethyl methacrylate, 2-hydroxy propyl methacrylate, allyl alcohol, methallyl alcohol, and the like. These enable the desired cure to take place and also provide adequate dispersibility in water at minimum acid content. Proportions of from 5–50%, preferably from 10–35% based on the weight of the polymer are used.

It is also important for the desired self-curing properties that the interpolymer include a proportion of an ethylenically unsaturated material providing free carboxylic groups. These materials are illustrated by acrylic acid, methacrylic acid, crotonic acid, itaconic acid, monobutyl maleate, and the like. These may be used in an amount of from 1 to 10% by weight of the interpolymer, preferably from 2–8% by weight. The purpose is to provide sufficient carboxyl functionality to provide the desired acid number needed to effectively disperse the hydroxy-functional copolymer. As previously indicated, the acid number must be limited as has been discussed. It should also be noted that the acid value does more than provide an affinity for water to enable the thermosetting interpolymers of the invention to be dissolved or dispersed in the aqueous medium as a salt since this acidity is reactive with the hydroxyl groups and is largely consumed during the cure.

It is again stressed that the proportion of unsaturated acid must be minimized. While a small proportion of acid is helpful to the cure (as both catalyst and coreactant) any excessive proportion of acid creates a problem of water sensitivity as described hereinbefore. It is the utilization of appropriate water soluble hydroxy functional polyesters and appropriate proportions of hydroxy-containing monomers which enables the carboxyl functionality required for effective dispersion in water to be greatly minimized.

The copolymerization is preferably conducted in solution in an organic solvent to provide the low molecular weight copolymers which are needed. It is preferred to employ an organic solvent which is miscible with water since this facilitates subsequent association of the polymer in the desired aqueous medium. The preferred solvents are dioxane, ethanol, isopropanol, 2-ethoxy ethanol, 2-ethoxy ethanol acetate, propyl alcohol, etc.

Continuing with a discussion of matters which are reasonably well known to the art, the electrodeposited coatings of the invention are cured by baking, utilizing baking temperatures in the range of from 250–500° F. which are applied for periods of time varying from an hour to a few seconds with the highest temperature. In the absence of any external amine comopnent, it is preferred to apply baking temperatures of the order of 350–400° F. for periods of time of from 10–30 minutes.

When a resinous component containing a nitrogen-carried methylol groups is included in the copolymer as described in said application Ser. No. 529,924, or separately in the electrophoretic bath for deposition with the copolymer, then the baking temperature can be reduced, if this is desired, or the cure can be more extensive to increase chemical and solvent resistance as well as the hardness of the film. It should be understood that the details of the electrodeposit of any aminoplast component is not a feature of this invention.

Also, the electrophoretic deposition process is well known, it being conventional to apply a unidirectional electrical current having a potential in the range of from about 50 to about 500 volts to cause the deposition of the carboxylic resin together with any pigment which has been associated therewith. The deposit of resin occurs on the anode of the electrical system and the article to be coated is, accordingly, electrically connected to form the anode and immersed in the electrophoretic bath.

The invention is adapted to the electrophoretic deposition of clear resins as well as pigmented resins and the pigmentation can be of any hue or shade desired.

From the standpoint of the base which is used, volatile nitrogenous bases are preferred. While ammonia is suitable and preferred in some instances for reason of cost, the volatile aliphatic amines are of particular value for more accurate control of pH since they do not as easily volatilize out of the bath. These aliphatic amines are illustrated by monomethyl amine, dimethyl amine, diethyl amine, triethyl amine and morpholine. Non-volatile bases are less desirable, though potentially useful and are illustrated by the hydroxides and alkaline salts of sodium and potassium.

The invention is illustrated in the examples which follow.

EXAMPLE I

Preparation of water soluble resin

| | Parts by weight |
|---|---|
| Linseed fatty acid | 1530 |
| Synthetic glycerine (99%) | 900 |
| Isophthalic acid | 480 |
| Xylol | 30 |
| 2-ethoxy ethanol acetate | 30 |

Charge into a reactor equipped with an agitator, condenser, thermometer, and Stark and Dean trap. Heat to 450° F., using a nitrogen sparge. Hold for an acid value of 10. Cool to 400° F. and then add:

| | Parts by weight |
|---|---|
| Azelaic acid | 330 |
| Maleic anhydride | 170 |
| 1,1' isopropylidenebis (p-phenyleneoxy) di-2-propanol | 220 |
| 2-ethoxy ethanol | 720 |

Heat to 400° F. Hold for an acid value of 15.

Final characteristics

| | |
|---|---|
| Viscosity (Gardner-Holdt) | T+ |
| Solids (percent) | 80.4 |
| Acid value | 13.2 |
| Color (Gardner) | 7 |

EXAMPLE II

Preparation of acrylic copolymer

| | Parts by weight |
|---|---|
| Dioxane | 1000 |

Charge into reactor equipped with an agitator, reflux condenser, thermometer, and nitrogen inlet tube. Heat to 220° F.

| | Parts by weight |
|---|---|
| Isobutyl acrylate | 640 |
| Ethyl acrylate | 260 |
| Unsaturated polyester of Example I (80% solids) | 250 |
| Styrene | 400 |
| Hydroxyethyl acrylate | 400 |
| Acrylic acid | 100 |
| Benzoyl peroxide | 80 |

Premix monomers and add over 2 to 2½ hours at 220–230° F. Hold for one hour.

| | Parts by weight |
|---|---|
| Benzoyl peroxide | 4 |

Add. Hold for 2 hours.

| | Parts by weight |
|---|---|
| Benzoyl peroxide | 4 |

Add. Hold for 2 hours. Cool to 160° F.

| | Parts by weight |
|---|---|
| Triethyl amine | 150 |

Add over 15 minute period.

| | Parts by weight |
|---|---|
| Water | 7000 |

Add water slowly at 160° F. to 20% solids.

Final characteristics

| | |
|---|---|
| Viscosity (Gardner-Holdt) | A–B |
| Solids (percent) | 21.4 |
| pH | 8.1 |
| Color (Gardner) | 1 |

EXAMPLE III

Procedure for polymer preparation

| | Parts by weight |
|---|---|
| Dioxane | 500 |

Charge into a reactor equipped with an agitator, thermometer, reflux condenser and a nitrogen inlet tube.

| | Parts by weight |
|---|---|
| Isobutyl acrylate | 320 |
| Ethyl acrylate | 280 |
| Hydroxyethyl acrylate | 200 |
| Unsaturated polyester of Example I (80% solids) | 125 |
| Styrene | 65 |
| Acrylic acid | 35 |
| Benzoyl peroxide | 26 |

Premix and add to reactor over a 2½ hour period while maintaining the temperature at 230° F. Hold for one hour.

| | Parts by weight |
|---|---|
| Benzoyl peroxide | 4 |

Add. Hold for 2 hours at 230–235° F.

| | Parts by weight |
|---|---|
| Benzoyl peroxide | 2 |

Add. Hold for an additional 2 hours to complete monomer conversion.

Final characteristics

| | |
|---|---|
| Viscosity (Gardner-Holdt) | $Z_3$–$Z_4$ |
| Solids (percent) | 66.5 |
| Color (Gardner) | 1–2 |

An electrocoating composition is prepared utilizing 1500 grams of the polymer of Example III to which has been added 75 cc. of triethyl amine (to adjust to pH 7.8) and diluted with distilled water to provide a 10% solids solution electrocoating bath composition.

EXAMPLE IV

Procedure for polymer preparation

| | Parts by weight |
|---|---|
| Dioxane | 500 |

Charge into reactor equipped with an agitator, thermometer, reflux condenser and a nitrogen inlet tube.

| | Parts by weight |
|---|---|
| Isobutyl acrylate | 320 |
| Ethyl acrylate | 480 |
| Unsaturated polyester of Example I (80% solids) | 125 |
| Styrene | 65 |
| Acrylic acid | 35 |
| Benzoyl peroxide | 26 |

Premix and add to reactor over 2½ hour period at 230° F. Hold for one hour.

| | Parts by weight |
|---|---|
| Benzoyl peroxide | 4 |

Add. Hold for 2 hours at 230–235° F.

| | Parts by weight |
|---|---|
| Benzoyl peroxide | 2 |

Hold for additional 2 hours to complete monomer conversion.

Final characteristics

| | |
|---|---|
| Viscosity (Gardner-Holdt) | $Z_1$–$Z_2$ |
| Solids (percent) | 66.4 |
| Color (Gardner) | 1–2 |

To 1500 grams of the polymer above prepared are added 75 cc. of triethyl amine (to adjust pH to 7.8) and water to provide a 10% solids solution.

This polymer has very poor solubility properties in water and cannot be applied by electrophoretic process.

COATING PROCEDURE

The coating operation is performed in a metal tank, which is equipped with a recirculating pump and thermometer. The tank serves as a cathode and zinc phosphate treated steel panels are utilized as the anodes. The volume of the bath is two liters. Direct current is imposed on the metal container (cathode) and on the steel panels (anode) from an external circuit, steel panels 4 inches wide and 8 inches dipped length are used as anodes for coating.

COATING CONDITIONS

A constant electrical current density of 2½ amperes per square foot of immersed panel surface is utilized. The resin bath temperature is 85° F. and the coating time is 60 seconds. The electrical input is 30 coulombs per gram of coating applied. The pH of the bath is 7.5–8.0. The voltage across the bath is run up from zero to a maximum of 250 volts during the panel coating operation to deposit a film 1.2 mils in thickness before the electrical resistance of the film virtually stops deposition at the maximum voltage used. The deposited film, using the electrocoating bath composition of Example III, even before baking is water resistant, slightly tacky and has very good adhesion to metal.

After baking 4 minutes at 400° F. the film cures to provide a solvent resistant, pore free, hard and flexible coating. As the pH of the coating bath rises above 8.5, the hydroxy-acrylic polymer is added as a concentrate to reduce the bath pH and maintain it between 7.5 and 8.5.

It is of interest to compare the copolymer of Example III with that produced in Example IV. These examples have identical monomer compositions with the exception that in Example IV, a portion of the hydroxy ethylacrylate component in Example III is replaced by ethyl acrylate.

| Monomer composition (percent by weight) | Example III | Example IV |
|---|---|---|
| Isobutyl acrylate | 32.0 | 32.0 |
| Ethyl acrylate | 28.0 | 48.0 |
| Oil-modified water soluble resin of Example I | 10.0 | 10.0 |
| Styrene | 6.5 | 6.5 |
| Hydroxy ethyl acrylate | 20.0 | |
| Acrylic acid | 3.5 | 3.5 |
| | 100.0 | 100.0 |
| Viscosity (Gardner-Holdt) | $Z_3$–$Z_4$ | $Z_1$–$Z_2$ |
| Solids (percent) | 66.5 | 66.4 |
| Acid value | 32.5 | 32.4 |

The polymer of Example III has good water solubility at pH 7.1 or above and deposits well using electrophoresis. Moreover, the electrophoretically applied film has good curing properties when baked for 20 minutes at 400° F. The importance of having an hydroxy monomer in the copolymer is particularly established by the good xylol resistance which is obtained.

In contrast with the excellent results achieved in accordance with the invention and as illustrated in Example III, the polymer of Example IV (hydroxy ethyl acrylate replaced with ethyl acrylate) has poor solubility properties in water and cannot be applied by electrophoresis. Even when a film is deposited from organic solvent solution and baked for 20 minutes at 400° F., it is still very tacky and dissolves readily in xylol. Accordingly, the essential presence of the hydroxy monomer in accordance with the invention has been demonstrated to simultaneously provide the solubility properties in water needed for electrophoresis as well as a capacity for superior use.

To further show that the hydroxy-containing component is essential to the invention, two additional polymers are prepared utilizing the same procedure as in Example III.

| Monomer composition (percent by weight) | Example V | Example VI |
|---|---|---|
| Isobutyl acrylate | 39.5 | 39.5 |
| Ethyl acrylate | 33.0 | 53.0 |
| Styrene | 5.0 | 5.0 |
| Hydroxy ethyl acrylate | 20.0 | |
| Acrylic acid | 2.5 | 2.5 |
| | 100.0 | 100.0 |
| Viscosity (Gardner-Holdt) | $Z_3$–$Z_4$ | $Z_1$–$Z_2$ |
| Solids (percent) | 66.6 | 66.5 |
| Acid value | 26.0 | 25.9 |

The polymer of Example V has good water solubility at pH 7.5 or above and when an electrophoretically applied film thereof is baked for 20 minutes at 400° F., it is not tacky and exhibits good xylol resistance.

In Example VI where hydroxy ethyl acrylate is replaced by ethyl acrylate, and using the same amount of acrylic acid, the modified polymer has poor solubility properties in water, and even when a film thereof is deposited manually and baked for 20 minutes at 400° F. it is still very tacky and dissolves readily in xylol. This again illustrates the esesntial presence of the hydroxy monomer in accordance with the invention to obtain the water solubility and curing properties needed.

EXAMPLE VII

Example V is repeated with the exception that the 10% solids solution of polymer subjected to electrophoresis in Example V is modified by the addition of 25%, based on the solids content of the solution, of hexamethoxy methyl melamine which disperses in the aqueous solution. When the mixture so-provided is subjected to electrophoresis, the hexamethoxy methyl melamine is deposited together with the copolymer, the film which is electrodeposited containing from 8–10%, by weight of hexamethoxy methyl melamine based on the total weight of resin deposited.

When the electrophoretically applied film containing the 8–10% by weight of hexamethoxy methyl melamine is baked as indicated previously (20 minutes at 400° F.) the solvent and chemical resistance of the film is improved and the film is harder and possesses improved detergent resistance.

The invention is defined in the claims which follow.

I claim:

1. An aqueous dispersion comprising water having dispersed therein a salt of a volatile nitrogenous base with a copolymer formed by solution copolymerization of ethylenically unsaturated components comprising a small proportion of monoethylenically unsaturated carboxylic acid, a proportion of ethylenically unsaturated hydroxy-terminated condensation resin containing esters of polyhydric alcohols with fatty acid, and 5–50% based on the weight of the copolymer of ethylenically unsaturated monomer providing at least one primary or secondary hydroxy group, the proportion of said acid being sufficient to effectively disperse said copolymer via salt formation and being insufficient to effectively disperse said copolymer in the absence of the hydroxy-containing component thereof.

2. An aqueous dispersion as recited in claim 1 in which said monomer providing the hydroxy group is selected from the group consisting of 2-hydroxy ethyl acrylate, 2-hydroxy ethyl methacrylate, 2-hydroxy propyl methacrylate, allyl alcohol, and methallyl alcohol.

3. An aqueous dispersion as recited in claim 1 in which said monoethylenically unsaturated acid is present in an amount of from 1–10% by weight of the copolymer.

4. An aqueous dispersion as recited in claim 1 in which the acid number of said copolymer is less than 50.

5. An aqueous dispersion as recited in claim 1 in which said monoethylenically unsaturated acid is selected from the group consisting of acrylic acid, methacrylic acid, crotonic acid, itaconic acid and monobutyl maleate.

6. An aqueous dispersion as recited in claim 1 in which the major proportion of the non-hydroxy containing portion of the copolymer is constituted by monomers selected from the group consisting of styrene, vinyl toluene, acrylonitrile and the $C_1$–$C_4$ alkyl esters of acrylic acid.

7. An aqueous dispersion as recited in claim 1 in which said condensation resin is an hydroxy-functional polyester formed by the reaction of components including dicarboxylic acid with polyhydric alcohols comprising a major portion of aliphatic polyhydric compounds containing at least three hydroxy groups, there being at least 1.5 equivalents of hydroxy-functionality per equivalent of carboxy functionality in the components forming said polyester, said polyester containing from 0.005 to 0.40 gram mole of ethylenic unsaturation per 100 grams of polyester.

8. An aqueous dispersion as recited in claim 1 in which said dispersion includes a water-miscible organic solvent.

9. An aqueous dispersion as recited in claim 1 in which the acid number of said copolymer is less than 30.

10. An aqueous dispersion as recited in claim 1 in which said aqueous dispersion includes a proportion of dispersed aminoplast resin adapted to be electrodeposited with said copolymer.

11. An aqueous dispersion comprising water having dispersed therein a salt of a volatile nitrogenous base with a copolymer formed by copolymerization in solution in a water-miscible organic solvent of ethylenically unsaturated components comprising a small proportion of monoethylenically unsaturated carboxylic acid providing the copolymer with an acid number less than 50, and up to 65% of an hydroxy component including from 5–50% based on the weight of the copolymer of ethylenically unsaturated material including a proportion of hydroxy-functional ethylenically unsaturated polyester containing esters of polyhydric alcohols with fatty acid and formed by the reaction of components including dicarboxylic acid with polyhydric alcohols comprising a major proportion of aliphatic polyhydric compounds containing at least three hydroxy groups, there being at least 1.5 equivalents of hydroxy-functionality per equivalent of carboxy functionality in the components forming said polyester, said polyester containing from 0.005 to 0.40 gram mole of ethylenic unsaturation per 100 grams of polyester, and from 5–10% based on the weight of the copolymer of monoethylenically unsaturated monomer containing a single primary or secondary hydroxy group, the proportion of said acid being sufficient to effectively disperse said copolymer via said salt formation and being insufficient to effectively disperse said copolymer in the absence of said hydroxy-containing material.

12. An aqueous dispersion as recited in claim 11 in which the major proportion of the non-hydroxy containing portion of the copolymer is constituted by monomers selected from the group consisting of styrene, vinyl toluene, acrylonitrile and the $C_1$–$C_4$ alkyl esters of acrylic acid.

13. An aqueous dispersion as recited in claim 11 in which said copolymer has an acid number less than 30, the components forming said polyester contain at least 2.0 equivalents of hydroxy-functionality per equivalent of carboxy functionality, and at least 50% of the hydroxy-functional materials used in the production of said polyester contain at least three hydroxy groups per molecule.

14. An aqueous dispersion as recited in claim 11 in which said monoethylenically unsaturated monomer containing a single primary or secondary hydroxy group is present in an amount of from 10–35% based on the weight of the copolymer.

References Cited

UNITED STATES PATENTS

| | | | |
|---|---|---|---|
| 3,163,615 | 12/1964 | Sekmakas | 260—22 |
| 3,245,932 | 4/1966 | Glavis et al. | 260—29.4 |
| 3,287,294 | 11/1966 | Sekmakas | 260—22 |
| 3,297,557 | 1/1967 | Huggard | 260—22 |
| 3,340,221 | 9/1967 | Goldberg et al. | 260—29.6 |
| 3,352,806 | 11/1967 | Hicks | 260—29.4 |

DONALD E. CZAJA, Primary Examiner

R. W. GRIFFIN, Assistant Examiner

U.S. Cl. X.R.

117—132, 161; 204—181; 260—22, 23, 29.6, 32.4, 32.6, 33.2, 33.4

PO-1050
(5/69)

UNITED STATES PATENT OFFICE
CERTIFICATE OF CORRECTION

Patent No. 3,506,601    Dated April 14, 1970

Inventor(s) Kazys Sekmakas

It is certified that error appears in the above-identified patent and that said Letters Patent are hereby corrected as shown below:

Column 3, line 47, "acid" should be --acids--
Column 4, line 3, "thus" should be --this--
Column 4, line 27, "in" should be --into--
Column 5, line 38, "comopnent" should be --component--
Column 9, line 11, "esesnitial" should be --essential--
Column 9, claim 7, line 5 of the claim, "portion" should be --proportion--
Column 10, claim 11, line 20 of the claim, "5-10%" should be --5-50%--

SIGNED AND
SEALED
SEP 22 1970

(SEAL)
Attest:

Edward M. Fletcher, Jr.
Attesting Officer

WILLIAM E. SCHUYLER, JR.
Commissioner of Patents